United States Patent [19]

Worsham, III

[11] 4,291,545

[45] Sep. 29, 1981

[54] ABSORPTION HEAT PUMP

[76] Inventor: James R. Worsham, III, 115 Village Rd., Lynchburg, Va. 24502

[21] Appl. No.: 110,964

[22] Filed: Jan. 10, 1980

[51] Int. Cl.³ .................... F25B 27/02; F25B 15/00
[52] U.S. Cl. .................... 62/238.3; 162/148; 162/476
[58] Field of Search .............. 62/238 B, 148, 324, 62/476, 159

[56] References Cited

U.S. PATENT DOCUMENTS

| | | | |
|---|---|---|---|
| 2,004,843 | 6/1935 | Wilkes et al. | |
| 2,180,634 | 11/1939 | Hubacker | |
| 2,212,869 | 8/1940 | Tornquist | 62/238 B |
| 2,243,478 | 5/1941 | Knoy | |
| 2,269,100 | 1/1942 | Kohler | 62/238 B |
| 3,080,729 | 3/1963 | Grubb | 62/238 B |
| 3,253,421 | 5/1966 | Grubb | 62/148 |
| 3,254,507 | 6/1966 | Whitlow | 62/238 B |
| 3,304,742 | 2/1967 | Eisberg | |
| 3,605,873 | 9/1971 | Leonard, Jr. | 165/2 |
| 3,626,716 | 12/1971 | Leonard, Jr. | 62/324 |
| 3,777,508 | 12/1973 | Imabayashi et al. | 62/324 |
| 3,902,546 | 9/1975 | Linhardt et al. | 62/324 |
| 4,037,649 | 7/1977 | Hartka | 62/148 X |
| 4,112,705 | 9/1978 | Sisk | 62/238 |
| 4,127,009 | 11/1978 | Phillips | 62/476 |
| 4,127,010 | 11/1978 | Phillips | 62/476 |
| 4,127,993 | 12/1978 | Phillips | 62/476 |

FOREIGN PATENT DOCUMENTS 760945 3/1934 France ............... 62/238 B

OTHER PUBLICATIONS

Kents Mechanical Engineers Handbook, 12th ed. New York, N.Y., "Power Volume", pp. 1-6, 29-34, J. Kenneth Salisbury, Editor.

Primary Examiner—Lloyd L. King
Attorney, Agent, or Firm—Norman B. Rainer

[57] ABSTRACT

This disclosure documents the invention of adapting an economizer and an air heater to an absorption heat pump. The heat pump will have as its prime source of power, heat generated from burning a source of fuel. The air used in the burner will be heated above outside ambient temperatures by a source of waste heat. The warmed air will then be ducted into the furnace. After the heat from the burned fuel has been used to power the heat pump, the exhaust heat will be utilized in the economizer to provide additional heat to the heat pump system.

6 Claims, 1 Drawing Figure

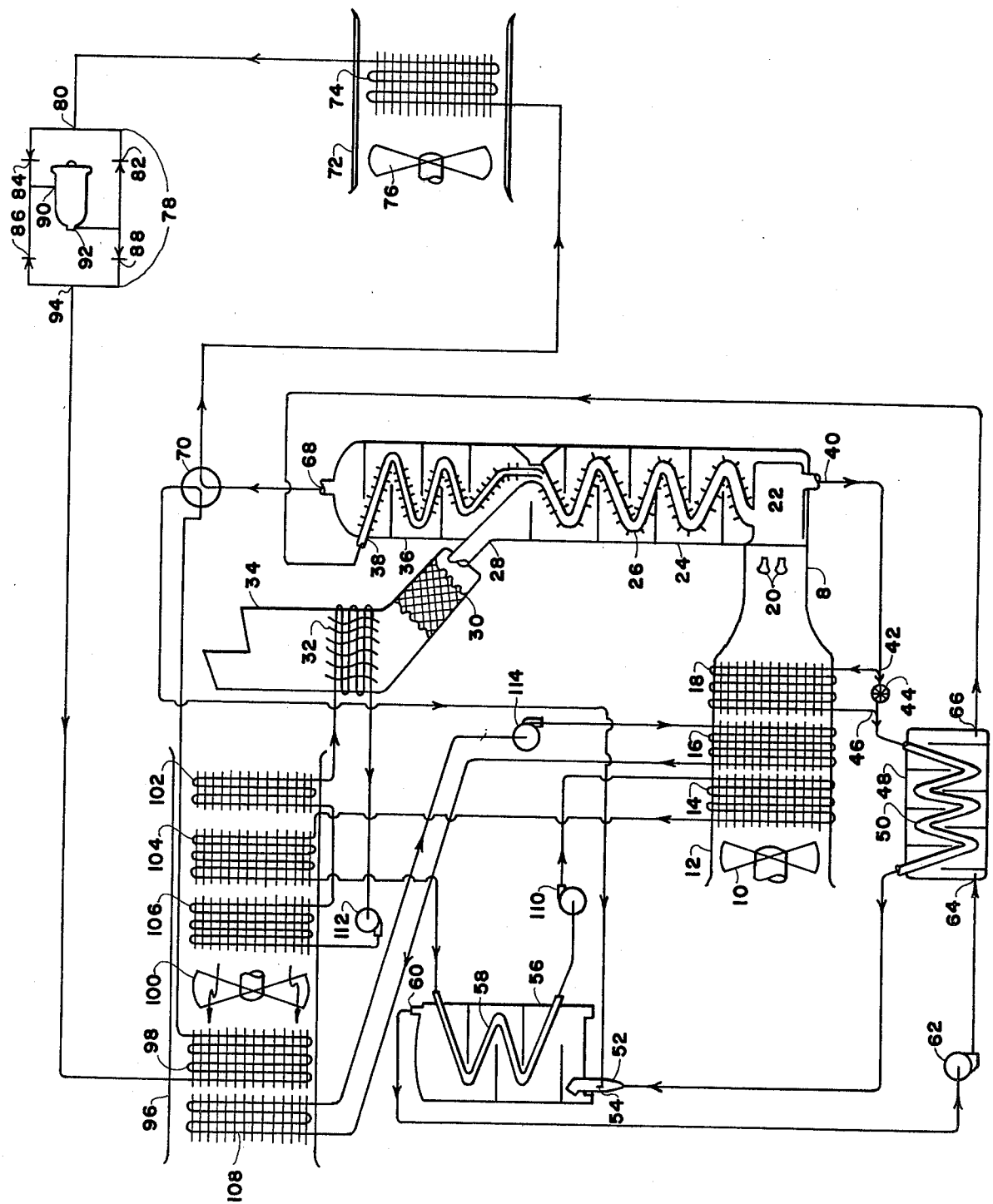

ABSORPTION HEAT PUMP

BACKGROUND OF THE INVENTION

The heat pump is a device which operates with equipment developed for mechanical refrigeration, but by designing the cycle to be reversible, the operation of the heat pump can provide heat for warmth when ambient temperatures are cold as well as normal cooling when ambient temperatures are hot.

There are two common types of heat pumps. The first is the vapor compression heat pump, and the second is the absorption heat pump. The vapor compression heat pump is by far the most prevalent type currently being used. It is characterized by a compressor, two heat exchangers, one termed a condenser and the other termed an evaporator, and an expansion valve or capillary tube. The power to the compressor in most instances is supplied by an electric motor. This type of heat pump is not much more expensive than a central air conditioning unit. Its efficiency, or coefficient of performance (defined as the ratio of the energy provided for heating or cooling to the energy required to power the system) is between 2.0 and 3.0 when ambient temperatures are greater than 15° F. Therefore when electrical costs are 4.5 cents per kilowatt-hour or less, this type of heat pump is an economical heat source compared to heating with oil at 50 cents per gallon.

While the vapor compression heat pump has found a wide range of usage because of its economic advantages in moderate climates, the usage of the absorption-type heat pump has been limited.

The absorption heat pump is characterized by an absorber, a generator, several heat exchangers, one of which is termed a condenser and another termed an evaporator, and an expansion valve or capillary tube. The power to operate the absorption heat pump is a high temperature heat source capable of causing the refrigerant, a volatile species to separate from an absorbing solution in the generator. If the high temperature is achieved by burning a commercial fuel, it would appear that the absorption heat pump would be economically attractive for heating in comparison to an ordinary furnace.

The absorption heat pump however has not become commercially viable because its coefficient of performance is too low, approximately 1.40, and the unit's cost is very high. Several patents and other publications relating to this subject have suggested improvements to increase the coefficient of performance. However, early patents concerning the absorption heat pump show that the original concepts produce coefficients of performance near the Rankine efficiency limit. Therefore improved heat transfer arrangements have tended to require increased equipment costs that are not sufficiently offset by an increased efficiency. The absorption heat pump has consequently remained generally unsuitable for commercial use.

SUMMARY OF THE INVENTION

This invention is designed to increase the efficiency of the absorption heat pump by adapting two additional heat exchangers to the system, one termed an economizer and the other termed an air heater. As mentioned hereinabove, the absorption heat pump operates near the Rankine efficiency limit. Therefore it appears contradictory to attempt to use additional heat exchangers to increase efficiency. The Rankine limit however applies to the basic components of the heat pump, namely the generator, absorber, condenser and evaporator. The economizer and air heater increase the efficienty of the system by providing heat exchange between the heat pump and the furnace. The description of how these heat exchangers are employed to increase the heat pump's efficiency will be described in detail hereinafter. However, the basic concepts are briefly outlined below.

The absorption heat pump system can be divided into four components which control the system's efficiency. These are: (1) the generator; (2) the absorber; (3) the evaporator, and; (4) the furnace. The first three components are identified from Carnot's theoretical expression for the thermodynamic efficiency of the heat pump. The fourth component is the key to this invention. Previous heat pump designs have ignored the inherent inefficiency of the furnace. Furthermore, previous designs have overlooked how the efficiency of both the furnace and the heat pump can be increased by providing heat exchange paths between the furnace and the heat pump components. The heat exchangers, identified herein, to accomplish this have been referred to as: (1) the air heater, which will connect the absorber, furnace and evaporator, and; (2) the economizer, which will connect the furnace and evaporator (or condenser).

It should be noted that the generator was not included as one of the components of the heat exchange process. This does not mean heat exchange will not occur between the air heater and the generator. Rather it means that theoretically the system's efficiency is increased by increasing the temperature of the generator which would also require an increase in the furnace temperature. While such temperature increases would raise the efficiency of both the furnace and heat pump, this concept is rather standard and not preferred in this invention.

The increased efficiencies to be gained with the air heater are; (1) to increase the temperature of the air entering the furnace, (2) to lower the temperature of the absorber and, (3) to increase the temperature of the evaporator by increasing the temperature of the outside air supplying heat to the evaporator.

The increased efficiencies to be gained with the economizer are; (1) to decrease the temperature of the flue gases and, (2) to further increase the temperature of the evaporator by supplying an even higher temperature than mentioned above to the outside air.

The air heater and economizer consequently increase the efficiency of the absorption heat pump system by redistributing the temperatures of the furnace, absorber and evaporator to be in a more nearly optimal thermodynamic arrangement.

BRIEF DESCRIPTION OF THE DRAWING

The concepts of this invention are diagrammatically illustrated in the attached FIGURE. By schematically showing the operation of an absorption heat pump employing an air heater and economizer the principles for improving the system's efficiency can easily be understood.

DESCRIPTION OF THE PREFERRED EMBODIMENT

Referring to the FIGURE, there is shown an absorption heat pump system set to operate in the heating mode. The outside air supply for the furnace, 8, is drawn into the air heater duct system, 12, with fan 10.

Passing through duct 12, the air is warmed by the first stage air heater, 14. Continuing on, the air passes through the second stage air heater, 16, which is inactive when the system is used for heating, and through the third stage air heater, 18, where the air is further heated. The air then goes into the furnace, 8, where fuel is supplied (through nozzles 20 in this example) and ignited. The hot combustion gases are directed into the boiler section, 22, of the generator, 24. The gases then flow up through the generator, 24, around the analyzer, 26, and out the flue, 28. Exiting from the flue, 28, the gases are only warm, having given up their heat to the strong solution in the analyzer, 26, and boiler 22.

The term strong solution is defined herein to mean a solution which contains a high quantity of refrigerant absorbed in the absorbent. The term weak solution is conversely intended to denote a solution which contains a low quantity of refrigerant in the absorbent.

While the gases leaving the flue 28 are only warm, they are much hotter than the outside ambient air temperature. Therefore the flue gases are passed through a filter-precipitator 30 and through the heater stage of an economizer 32. Leaving the heater stage of the economizer 32, the now cool gases are passed up the chimney 34 to the atmosphere. (When the system is operating in the cooling mode the heater stage of the economizer will be inactive.) This completes the operational phases of the furnace. Outside air is preheated in the air heater system used in the combustion process, heats the strong solution, provides economizer heat, and is discharged back to the atmosphere. Attention now centers on the operation of the heat pump.

The strong solution enters rectifier 36 through heat exchange tubing 38. Passing through heat exchange tubing 38 in rectifier 36, the strong solution is heated slightly by the hot refrigerant gas within the rectifier. Flowing from the rectifier, the strong solution drops into the analyzer 26, which is a portion of generator 24. In the analyzer, the combustion gases heat the strong solution, causing the refrigerant to be separated from the absorbent by boiling. The refrigerant will then flow counter to the absorbent solution, back towards rectifier 36. The absorbent solution continues to flow toward the boiler, 22. Upon reaching the boiler the absorbent solution is very hot and contains only a small amount of refrigerant. This weak solution flows out of the boiler and generator through the outlet line, 40.

The weak solution continues in the outlet line until it reaches the elbow joint, 42. At the elbow joint the weak solution will split, and some fraction will go through the third stage air heater, 18, giving up some of its heat in the process, and some fraction will continue through flow regulator 44. The two fractions will come together again at elbow 46.

The flow regulator, 44, is governed by the temperature of the refrigerant gases leaving the rectifier, 36, at the outlet, 68. If the refrigerant is too hot the flow regulator closes, forcing more of the weak solution through the third stage air heater, 18. If the refrigerant is too cool, the flow regulator opens and more of the hot weak solution flows directly into the weak-strong solution heat exchanger, 48.

In the weak-strong solution heat exchanger, the weak solution flows through tubing 50, which has cold strong solution flowing around the outside. The high temperature weak solution gives up some of its heat, becoming cooler, and the low temperature strong solution absorbs the heat, becoming hotter.

The warm weak solution leaves the weak-strong solution heat exchanger and enters jet pump 52. As it enters the jet pump the pressure is significantly reduced. The low pressure weak solution flows past the refrigerant outlet, 54, where the weak solution and refrigerant mix. Both the weak solution and refrigerant then flow out of the jet pump at a rather high velocity into the absorber, 56, inducing a vortex. The mixture of weak solution and refrigerant swirl up through the absorber, being cooled by coolant in tubing 58. By maintaining the mixture at a low temperature the weak solution absorbs the refrigerant and becomes cold strong solution, exiting the absorber at outlet 60.

The strong solution is drawn from the absorber outlet into pump 62 where the pressure is significantly increased. The cold, high pressure, strong solution then flows into the weak-strong solution heat exchanger, 48, at inlet 64. As was indicated hereinabove, the cold strong solution is heated by the hot weak solution flowing in tubing 50. The now warm strong solution leaves the weak-strong solution heat exchanger at outlet 66 and flows into the rectifier, 36, at inlet 38. Thus we have completed the loop of the absorbent flow path, from strong solution entering the rectifier, to weak solution leaving the generator, back to strong solution.

In following the path of the absorbent we described the separation of the strong solution in the analyzer section, 26, of the generator, 24. The heat of the combustion gases causes the refrigerant to be separated from the absorbent by boiling. The refrigerant then flows counter to the absorbent solution back into the rectifier, 36. The hot refrigerant gases flow around the heat exchange tubing, 38, which is carrying the warm strong solution. The hot refrigerant gases give up some of their heat to the strong solution in the heat exchange tubing, 38, and are thereby slightly cooled. The moderately hot refrigerant leaves the rectifier at outlet 68, and flows towards the four way valve, 70.

When the system is operating in the cooling mode the four way valve would direct the refrigerant gases towards the left and the outside/economizer duct system, 96. However in the heating mode, which is the example described herein, the four way valve directs the refrigerant gases towards the right, to the inside duct system, 72. The moderately hot refrigerant gases flow into the condenser, 74, where the refrigerant is condensed to a liquid. The heat of condensation is given up to the inside air by using the fan, 76, to draw the cool inside air (from a space requiring warmth) into duct 72 and blowing it over the condenser. The inside air is thereby heated. (When the heat pump system is operating in the cooling mode the condenser will become the evaporator and thus cool the inside air.)

Leaving the inside duct system, 72, the warm liquid refrigerant flows to the expansion valve system, 78, where it enters the T-divider, 80. The refrigerant may go to either check valve 82 or 84, but check valve 82 only allows flow through it in the opposite direction. Therefore, the refrigerant goes through check valve 84. Check valve 86 prevents the refrigerant from flowing through it, requiring the liquid refrigerant to flow through expansion valve 90. In the expansion valve, the pressure of the refrigerant is significantly reduced and the temperature drops accordingly. The cold, low pressure refrigerant leaves the expansion valve at the outlet, 92, and travels towards check valves 82 and 88. However check valve 82 is held shut by the high pressure refrigerant on the other side. Therefore the cold, low pressure refrigerant flows through check valve 88. The refrigerant may either flow out of the expansion valve system at the T-divider, 94, or flow towards check valve 86. However check valve 86 is held shut by the high pressure refrigerant on the other side, so all refrigerant flows out of the T-divider, 94.

The cold refrigerant flows on towards the outside/economizer duct system, 96. In the duct system the refrigerant enters the evaporator, 98, where the liquid vaporizes to become cold refrigerant gases. The heat of vaporization is supplied by air, drawn by fan 100 in the direction indicated by the arrows, and blown through the evaporator, 98. The outside air has been successively warmed in the duct system by the first stage economizer, 102, the second stage economizer, 104, and the third stage economizer, 106. In the physical duct system the first and second stage economizer sections would actually be one over the other (in parallel) with the outside air flowing independently through both sections. (The fourth stage economizer, 108, would be inactive when the heat pump is in the heating mode.)

The cold refrigerant gases travel out of the evaporator, 98, and towards the four way valve, 70. They pass through the four way valve and flow on to jet pump 52, where they pass through the refrigerant outlet, 54, mixing with the weak solution. Then as previously described, both the weak solution and refrigerant flow out of the jet pump at a rather high velocity into the absorber.

The above descriptions thus far have outlined the operation of a basic absorption heat pump and briefly indicated the interaction of the heat pump with the various stages of the air heater and economizer systems. The following descriptions further outline the preferred embodiments of the concepts for the employment of the air heater and economizer.

The absorber, 56, generates heat when the weak solution absorbs the refrigerant gases and becomes the strong solution. This heat is removed by a coolant flowing in tubing 58. The very warm coolant is sucked out of the absorber by pump 110 and sent to the first stage of the air heater, 14. Depending on the outside ambient temperatures, the coolant traveling through the first stage 14, will give up heat to the air flowing in the air heater duct system, 12. The warm, or slightly cool coolant will then flow to the second stage economizer, 104, where the remaining heat is picked up by the air flowing through the outside/economizer duct system, 96. The now very cold coolant (near the outside temperature) will flow back to the absorber. This very cold coolant will lower the temperature of the strong solution leaving the absorber at outlet 60, to a very low temperature.

As stated before, the second air heater stage, 16, will be inactive when the system is used for heating. Also, prior descriptions of the circulation of the hot weak solution indicated how heat is supplied to the third stage air heater, 18.

The very warm combustion gases leaving the generator, 24, at the flue, 28, have all suspended particles removed by the filter-precipitator, 30. These gases, as indicated earlier, pass through the economizer heater stage, 32. Cold coolant flowing inside the heater is appreciably warmed by the waste heat in the combustion gases. The warm coolant is pumped by pump 112 to the third stage of the economizer, 106, where it gives up most of its heat to the air flowing in the outside/economizer duct system. The cool coolant then flows to the first stage economizer section, 102, where in parallel with the second stage economizer, 104, the coolant temperature is reduced to nearly that of the outside temperature. The now very cold coolant reenters the economizer heater stage, 32.

In the cooling mode of operation the economizer's first and third stage along with the heater stage will be inactive. Pump 112 would not be operating. Furthermore the heat exchanger previously termed the evaporator, 98, would now be the condenser. The air leaving the condenser, 98, in the outside/economizer duct system, 96, would be very hot. This high temperature air would pass through the fourth stage of the economizer, 108, where coolant circulating through the tubing would carry the heat out of the fourth stage and into the second stage of the air heater, 16. The coolant circulation in this loop will be maintained by pump 114.

While this invention has been described with some detail as to the preferred embodiments, it is to be understood that the description is for the purpose of illustrating the principles only. The scope of the illustrated embodiments characterized a single heating system with a reversible mechanism to selectively provide both heating and cooling. However it will be appreciated that the system could be adapted for separate heating, or cooling, or both heating and cooling. The heat exchange mechanisms were principally illustrated as liquid-gas temperature interchanges without the fluids coming in contact. This heat exchange mechanism could be between any type of media, liquid-liquid, gas-gas, liquid-solid-gas, etc., and could furthermore involve direct contact of the fluids or media. A wide range of modifications and substitutions could be suggested without departing from the fundamental concept of the invention. Accordingly, the invention is to be broadly construed and limited only by the scope and spirit of the claims now appended hereto.

Having thus described my invention, what is claimed is:

1. In a heat pump system for transferring heat from one site to another employing a confined volatile solute and solvent therefor, comprising a generator which causes heat to be applied to a solution comprised of said volatile solute in said solvent, thereby causing said volatile solute to separate in gaseous form from said solution which consequently emerges in hot condition containing little of said solute, a furnace which receives ambient air and combusts a fuel to form a heated air stream which is passed in heat exchange relationship through said generator and then through a flue, a condenser wherein said volatile solute is transformed from a gaseous form to a liquid form, an evaporator in which said volatile solute transforms from a liquid form to a gaseous form, and an absorber which causes said volatile solute to dissolve in said solvent with attendant generation of heat, said generator condenser, evaporator and absorber being arranged in sequential communication, the improvement comprising conduit means which obtains heat from said generator, absorber or condenser and delivers said heat to the ambient air received by said furnace, whereby the efficiency of operation of said heat pump system is improved.

2. System of claim 1 wherein said conduit means for transferring heat are substantially closed loop systems confining a heat exchange fluid propelled within said conduit means by a pump.

3. System of claim 2 wherein said conduit means is comprised of thin-walled tubular material, and absorbs and releases heat by thermal conduction through said walls.

4. System of claim 3 wherein said conduit means contains a series of spiral wraps positioned adjacent the sites for heat absorption and heat delivery.

5. System of claim 1 wherein said system additionally comprises a rectifier adapted to cool said volatile solute in gaseous form, and unneeded heat from said rectifier is transferred to said conduit means.

6. The system of claim 1 wherein the furnace of said system delivers unneeded generator heat to said evaporator such that the operating temperature of the evaporator is increased, whereby the efficiency of operation of said heat pump system is improved.

* * * * *